United States Patent
Carlson et al.

[15] 3,663,864
[45] May 16, 1972

[54] PORTABLE GOUND FAULT INTERRUPTER APPARATUS

[72] Inventors: Ernest R. Carlson, Fairfield; Czeslaw Mackiewicz, Trumbull; Paul C. Mirmina, Milford, all of Conn.

[73] Assignee: Harvey Hubbell, Incorporated, Bridgeport, Conn.

[22] Filed: Apr. 15, 1970

[21] Appl. No.: 28,576

[52] U.S. Cl...............317/101 DH, 174/52 R, 200/51 R, 307/150
[51] Int. Cl...........................................H02b 1/02
[58] Field of Search............317/101 DH, 101 LL, 101 C, 317/101 R, 99, 18; 220/3.94, 4; 174/52 R, 53 R, 66; 307/94, 114, 150, 10 R; 320/2; 334/166 R; 200/51 M

[56] References Cited

UNITED STATES PATENTS

| | | | |
|---|---|---|---|
| 3,471,706 | 10/1969 | Schneider | 307/10 R |
| 2,887,525 | 5/1959 | Lewus | 174/52 R |
| 2,388,054 | 10/1945 | Hartzell | 320/2 X |
| 2,662,110 | 12/1953 | Fiori | 339/106 R |
| 1,929,218 | 10/1933 | Sambleson | 220/3.94 |
| 3,120,414 | 2/1964 | Farish | 174/66 R |
| 2,988,655 | 6/1961 | Rudolph et al. | 200/51 LM UX |
| 2,625,591 | 1/1953 | George | 317/99 R |
| 2,590,805 | 3/1952 | Vitale | 307/150 R |
| 3,159,436 | 12/1964 | Davis | 174/52 X |

FOREIGN PATENTS OR APPLICATIONS

| 162,943 | 4/1954 | Australia | 317/18 B UX |
|---|---|---|---|

Primary Examiner—David Smith, Jr.
Attorney—Wooster, Davis & Cifelli

[57] ABSTRACT

A housing and component mounting assembly is described for a hand-portable ground fault interrupter apparatus. The housing comprises a base member and a cover member which includes a readily demountable electric receptacle plate. The components are arranged for compartmentizing the housing. The described arrangement enhances portability and receptacle replacement as well as increasing protection from electrical shock hazards.

12 Claims, 12 Drawing Figures

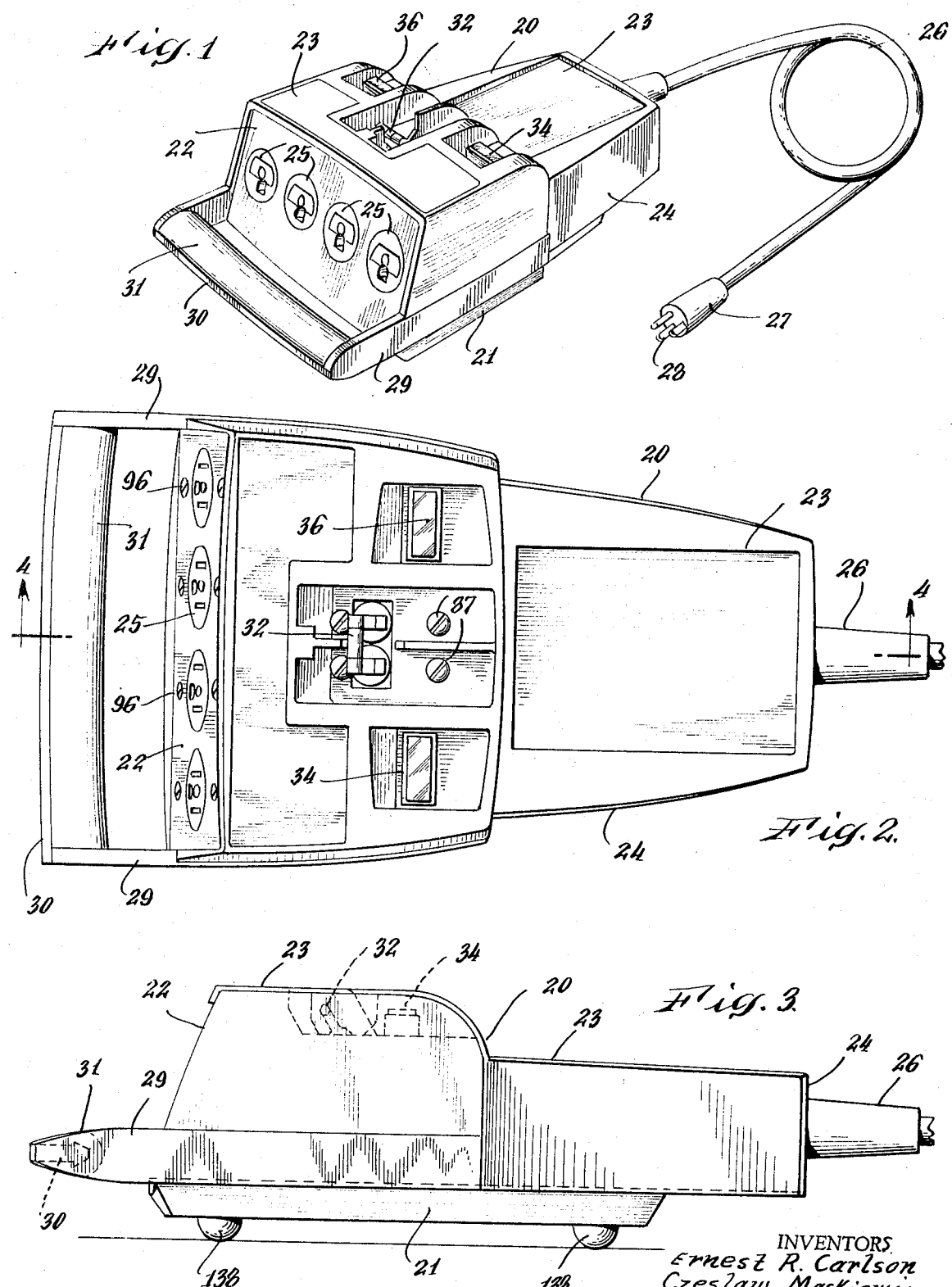

Patented May 16, 1972
3,663,864
3 Sheets-Sheet 2
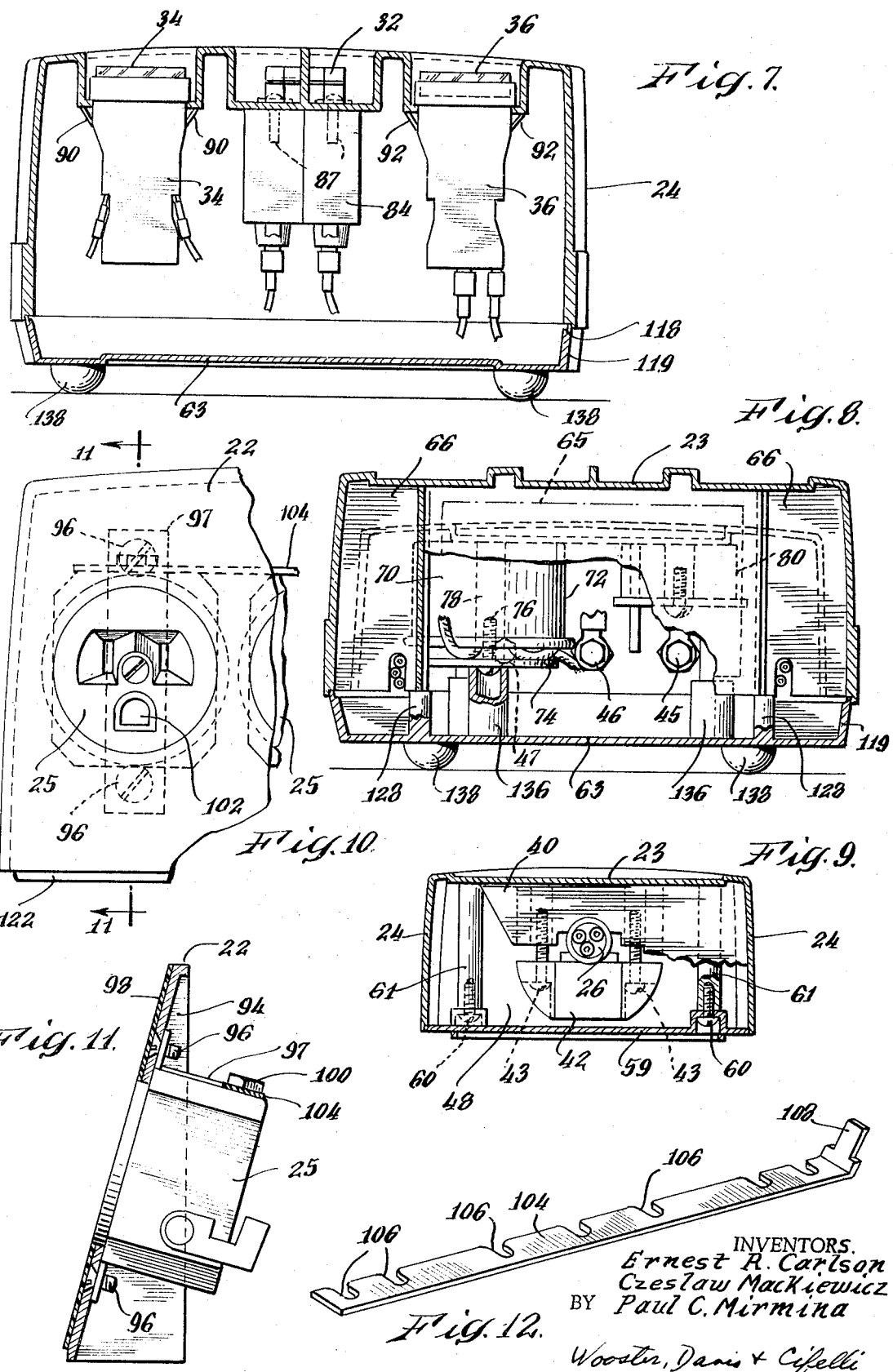
INVENTORS.
Ernest R. Carlson
Czeslaw Mackiewicz
Paul C. Mirmina
BY
Wooster, Davis & Cifelli
ATTORNEYS.

Patented May 16, 1972

INVENTORS.
Ernest R. Carlson
Czeslaw Mackiewicz
Paul C. Mirmina
BY Wooster, Davis & Cifelli
ATTORNEYS.

PORTABLE GOUND FAULT INTERRUPTER APPARATUS

BACKGROUND OF THE INVENTION

This invention relates to apparatus for automatically interrupting the application of electrical power to a device upon the occurrence of a ground circuit fault. The invention relates more particularly to the provision of an improved hand-portable ground fault interrupting (GFI) apparatus.

In various electrical systems, a ground circuit is established between an electrical utility device and a source of electrical power for the device. One purpose in providing the ground circuit is to eliminate possible electrical shock hazards if, for example, an insulation defect occurs in the utility device. The elimination of a shock hazard is particularly important in applications where personnel have occasion to frequently come into physical contact with the utility device. This can occur in hospital applications, for example, wherein the device may comprise an analytical or administrative instrument and patients are normally brought into physical contact with conductive members of the device. While a ground circuit can be readily provided through the use of grounded conductors in the power source, its distribution system and in ground leads in the power cable for the utility device, various faults can occur in this ground circuit. An undesirable result then is the creation of an apparently safe and grounded, yet potentially defective and hazardous, condition.

GFI apparatus have been provided in order to eliminate the electric shock hazard when a fault in a ground circuit does occur. A GFI apparatus is adapted for coupling electrical power from the source to the device and for automatically interrupting this coupling upon the occurrence of a ground circuit fault. The GFI apparatus includes a circuit arrangement for sensing the electrical condition of the ground circuit and for operating a circuit-breaking element which interrupts the application of electrical power to the device when a fault condition is indicated. Ground fault interrupting circuits are known and are described in detail, for example, in U.S. Pat. No. 3,473,091, Morris and McDonald, entitled Ground Leakage Differential Protective Apparatus, assigned to the assignee of this application.

In institutional, industrial and office uses, a large number of devices can derive electrical operating power from any of a great number of service outlets distributed throughout a building or office area. The provision of GFI apparatus at each outlet or even at each device then becomes prohibitively expensive. It is preferable to provide a GFI apparatus which can be utilized at a number of different locations.

It is an object of this invention to provide an improved form of GFI apparatus which may be transported and utilized at different locations.

Another object of the invention is to provide an improved hand-portable GFI apparatus.

Another object of the invention is to provide an improved, portable, multi-receptacle, GFI apparatus which can simultaneously supply the operating electrical power requirements for a plurality of utility devices.

Another object of the invention is to provide a portable GFI apparatus which eliminates potential shock hazards from the GFI apparatus itself.

A further object of the invention is to provide a GFI apparatus adapted for readily substituting various forms of receptacles in the apparatus.

Another object of the invention is to provide an improved form of two-piece handle having a non-slipping grip for facilitating transport of apparatus from location to location.

Still another object of the invention is to provide an improved power cable clamp for electrical apparatus.

Another object of the invention is to provide an improved, compartmentized housing arrangement for an electrical apparatus.

Another object of the invention is the provision of a compartmentized housing arrangement for electrical apparatus having access to power cable terminals for replacing the power cable while isolating other portions of the apparatus from the user.

These and other objects and features of the invention will become apparent from the following specifications and the drawings, wherein:

FIG. 1 is a perspective view of a GFI apparatus constructed in accordance with features of this invention;

FIG. 2 is a plan view of the apparatus of FIG. 1;

FIG. 3 is a side view of the apparatus of FIG. 2;

FIG. 7 is a sectional view taken along line 7—7 of FIG. 4 illustrating the mounting and positioning of a pilot light, a test pushbutton, and a circuit breaker of the GFI apparatus;

FIG. 8 is a sectional view taken along lines 8—8 of FIG. 4, partly cut away, illustrating the compartmentization of the apparatus housing as well as the mounting and positioning of various electrical components;

FIG. 9 is a sectional view taken along line 9—9 of FIG. 4 illustrating a cable clamp feature of the invention;

FIG. 10 is a partial front view of a receptacle plate of the apparatus illustrating a receptacle mounted thereto;

FIG. 11 is a sectional view taken along the line 11—11 of FIG. 10 illustrating the mounting of a receptacle to the plate and a shock hazard insulator arrangement for the plate; and, FIG. 12 is a perspective view of a grounding bar utilized for providing a common electrical ground conductor for receptacles mounted to the receptacle plate of FIG. 10.

Figure 4:
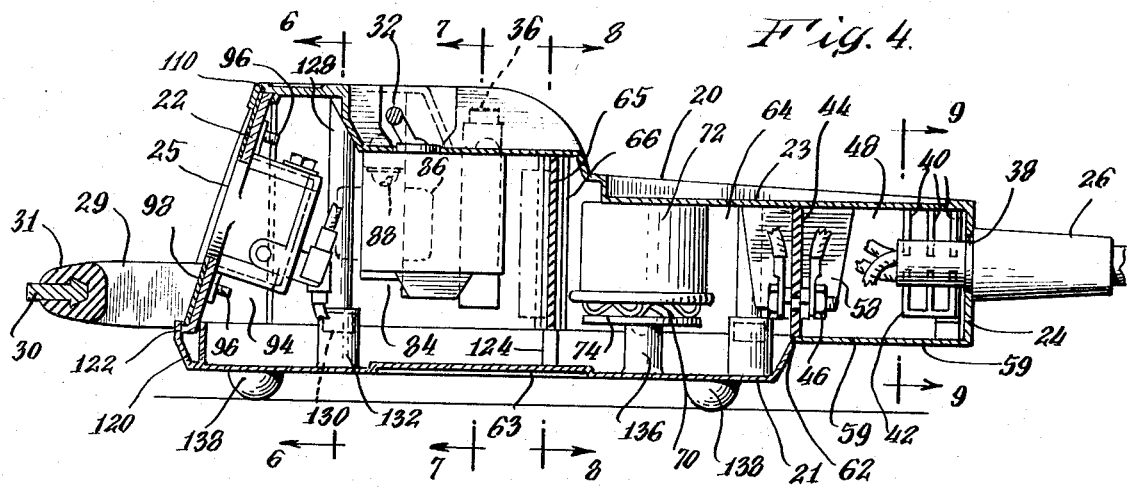
FIG. 4 is a sectional view of the apparatus taken along lines 4—4 of FIG. 2.
Figure 5:
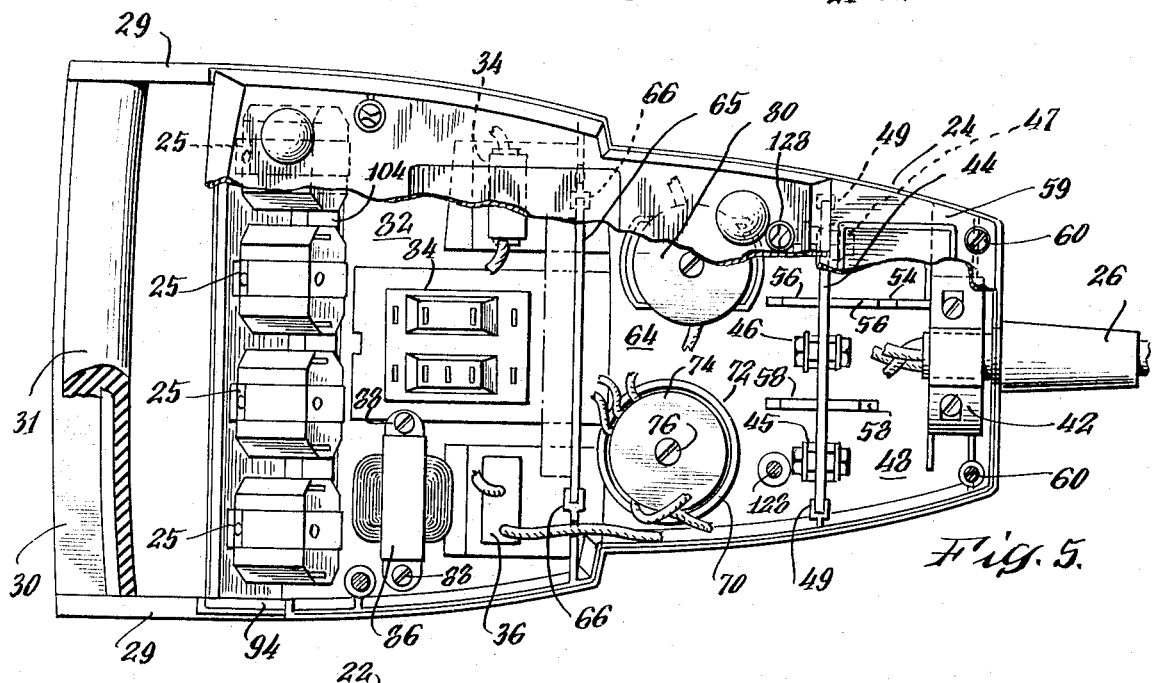
FIG. 5 is a bottom view of the apparatus of FIG. 3, partly cut away for illustrating the location and mounting of various electrical components.

Referring now to the drawings and particularly to FIGS. 1 - 5, a GFI apparatus is shown to include a housing which comprises a cover member referenced generally as 20, a base member 21, and a demountable receptacle plate 22. The cover member 20 which is formed as a thin-walled body of electrically insulative material includes an upper surface 23 having relatively planar segments, and an integral wall segment 24. The wall segment 24 which extends away from the surface 23 at the periphery of this surface also extends discontinuously above the periphery. The demountable receptacle plate 22 which is also formed of an electrically insulative material as a thin-walled body is positioned in a cap of the wall segment 24 of the cover member 20. This demountable plate is secured in place in the cover member 20 by the base member 21 which is similarly formed as a thin-walled body of electrically insulative material. As indicated in detail hereinafter, the base member 21 is demountably secured to the cover 20.

The receptacle plate 22 includes a plurality of electric receptacles 25, each shown to be of a standard two-pronged type having a ground terminal pin. A utility device to which electrical power is coupled will include a plug having a two-pronged arrangement and a ground terminal for mating with the receptacles 25. Electrical receptacles of other designs, such as a standard two-pronged type may also be used depending on the wiring arrangements of the energy source and the equipment to be used. Electrical power is supplied to the GFI apparatus for coupling to a utility device at a receptacle 25 through a power cable 26. The power cable 26 which also includes a two-pronged plug 27 having a grounding terminal pin 28 enters the apparatus housing through an aperture 38 located in a rear section of the wall 24.

The apparatus is hand-portable and is readily transportable from location to location by a carrying handle 29 which is integrally molded to the cover member 20. The handle 29 extends from the wall 24 in a forward direction about the receptacle plate 22. The handle 29 includes an integral elongated transverse segment 30 having an arrow-shaped cross section which receives a handle gripping body 31. The gripping body 31 includes an elongated groove having an arrow-shaped cross section which is adapted to mate with the arrow-shaped cross section of the transverse segment 30 and is thereby securely mounted to this segment.

The thin-walled, electrically insulative cover, base and receptacle plate of the housing in a typical but non-limiting arrangement are formed of molded LEXAN polycarbonate having a nominal thickness of 0.080 inch, for example. The housing is therefore constructed of a rugged material which exhibits a high impact force characteristic. The gripping member 31 is formed, for example, of extruded polyvinyl chloride which provides a substantially non-slip surface for gripping the apparatus.

In operation, the illustrated GFI apparatus is energized by inserting the power cable plug 27 into a power outlet receptacle which provides, for example, a 115 volt, A.C. 60 cycle potential and by advancing an operative lever 32 of a circuit breaker to its foremost position, as illustrated in FIG. 2. In the absence of a ground fault, the GFI apparatus is adapted to then cause a pilot light 34 to glow and indicate that power is being applied to the apparatus. The operativeness of circuit components internally positioned in the housing for interrupting the application of electrical power to a utility device, is determined initially by depressing a test pushbutton 36. The operation of the pushbutton 36 and its associated circuitry causes an apparent ground circuit fault to exist. The circuit breaker thus trips and the lever arm 32 returns to a rearmost position. Electrical power to the receptacles 25 is thereby interrupted and the pilot lamp 34 is simultaneously extinguished.

Figure 6:
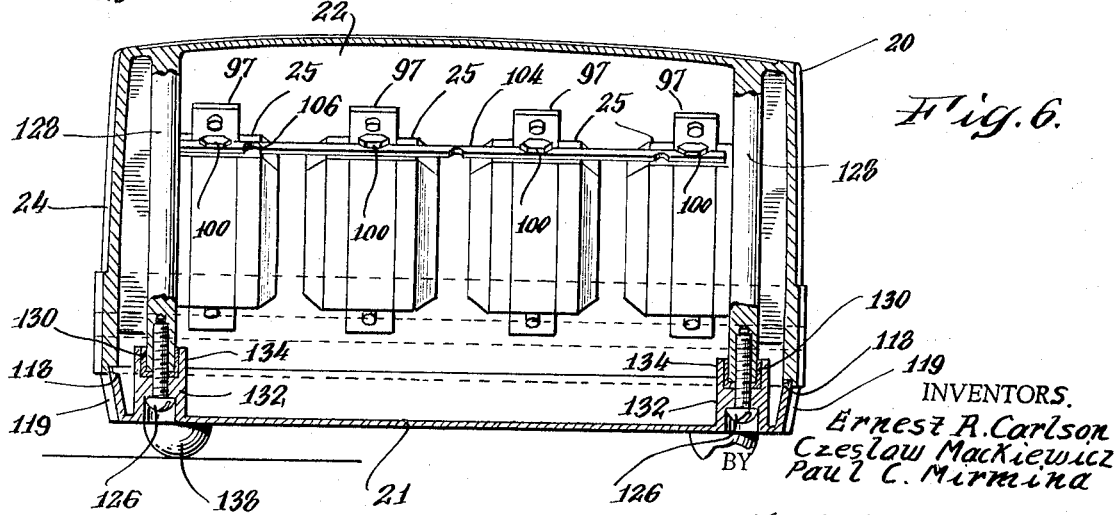
FIG. 6 is a sectional view taken along line 6—6 of FIG. 4 for illustrating a multi-receptacle array employed in the GFI apparatus.

A more detailed description of the GFI apparatus housing and assembly will now be given, particularly with respect to FIGS. 4 – 12. The power cable 26 extends through an aperture 38 in a rear segment of the wall 24 and is securely gripped by a cable clamp which includes a semicircular seat formed by a plurality of ribs 40 integrally molded in the cover member 20. A nylon clamp member 42 includes ribs corresponding to those of member 40 formed in a semicircular configuration for seating against the cable 22 which is laid between these members. As best seen in FIG. 9, the clamp members include symmetrically located holes through which screws 43 extend. These screws engage the internally threaded holes of clamp member 40. The cord clamping arrangement thus features a relatively simple yet rugged, inexpensive, and double insulating cord gripping facility.

The wall segment 24 of the cover 20 includes channels integrally formed on an inner surface thereof for spacing and supporting circuit boards. The circuit boards are positioned generally parallel to the receptacle plate 22 and compartmentize the housing. A first circuit board 44 (FIG. 5) comprises a terminal circuit board having feed-through terminal connectors 45, 46 and 47 thereon and extending through the board. These terminals provide a conductive connection between a power cable compartment 48 formed by the circuit board 44, the cover 20, and housing base member 21. The circuit board 44 is positioned in integrally molded channels 49 of the cover 20. One wire of the power cable 26 is connected (not illustrated) to the terminal 45, a second wire is connected (not illustrated) to the terminal 46, while a ground wire of the cable 26 is led (not illustrated) through a slot 54 in a shoulder 56 to the terminal 47. A second shoulder 58 is provided which along with the shoulder 56 assures rigidity of the circuit board in its extension across the cover member between the channels 49. These shoulders, which are integral with the upper surface 23, also function to prevent the possibility of uninsulated end segments of the cable at the terminals from coming into physical contact and thereby causing a short circuit. The housing base member 21 is shown to comprise a two-piece assembly including a plate 59 which forms a closure member for the compartment 48. The plate 59 is secured by a pair of screws 60 extending through apertures in this plate into internally threaded bosses 61 which are integrally molded on the inner surface of the cover 20. The plate 59 further includes a lip at a forward edge 62 thereof extending under an edge of a flanged segment of a second plate 63 of the housing base member 21.

A second compartment 64 for the apparatus is formed by the circuit board 44 and by a second circuit board 65. The board 65 is similarly positioned within the cover 20 by channels 66 which are integrally formed in the cover. Circuit board 65 includes circuit components mounted thereon which form a portion of the circuit arrangement for sensing the condition of the ground circuit. The second compartment 64 includes a differential transformer toroid 70 which is shielded from external magnetic fields by a cylindrically shaped magnetic shield 72. The toroid and shield are secured in place by a disc 74 formed of an insulating material. The disc is forced against the toroid and shield (FIG. 8) by a screw 76 extending through an aperture in the disc and engaging an internally threaded boss 78 which is integrally formed in the cover 20. A second toroid 80 is also positioned in this compartment and is mounted in a similar manner.

A third compartment 82 is formed by the circuit board 65 along with the receptacle mounting plate 22 and the cover 20. This compartment houses components which are mounted to the surface 23. These components include a circuit breaker 84, a transformer 86, the pilot light assembly 34, and a test pushbutton assembly 36. The various detailed circuit interconnections between these elements is not illustrated for purpose of clarity in the drawings. The circuit breaker 84 is mounted to the surface 23 by screws 87 which extend through the surface 23 at a recessed section and engage the circuit breaker body. In a similar manner, the transformer 86 is mounted by screws 88 extending through a metal core clamp for the transformer and engaging integrally formed bosses extending from an inner surface of the cover 20. The latter screws do not, therefore, extend through the surface 12. As illustrated in FIG. 7, both the test pushbutton 36 and the pilot light 34, each of which have housings formed of an electrically nonconductive material, include integral resilient tabs 90 and 92, respectively, which extend from and engage an inner surface of body 20 and secure these electrical elements to the body 20.

The receptacle mounting plate 22 is shown to include a plurality of horizontally positioned and aligned receptacles 25 mounted on the plate. The means for mounting the receptacles is illustrated clearly in FIGS. 4 and 11. The plate 22, which, as stated hereinbefore, is formed of an electrically non-conductive material, includes a generally flat surface having tapered flanged end segments 94. Apertures are formed in the plate 22 for introducing a plug to a receptacle. The receptacles 25 are mounted to the plate 22 by screws 96 which extend through the plate 22 from an outer surface thereof and engage threaded apertures in a metal yoke strap 97 of each receptacle. In order to provide a hazard-free electrically non-conductive surface, these screws and the receptacle plate are covered by a relatively thin polycarbonate plastic plate 98 which is secured to the plate 22 by conventional ultrasonic mechanical bonding techniques. In particular, the insulating plate is bonded to the receptacle plate 22 by the use of an annular energy director ring which is positioned about each receptacle aperture during the bonding process. Each of the receptacles 25 includes a screw 100 which engages a threaded aperture in the associated metal yoke strap 97. The strap 97 which is electrically conductive is conductively connected to a ground pin 102 of each receptacle. Common grounding of each of the receptacles is achieved by an elongated grounding bar 104 (FIG. 12) which is formed of electrically conductive material. The bar 104 is of generally rectangular cross section and includes spaced slots 106 for receiving the grounding screws 100 of associated receptacles. The grounding bar further includes an integral male stab terminal 108 flanging upwardly at an extremity thereof. This terminal 108 advantageously provides a quick-connect facility for the apparatus.

The receptacle plate assembly is slidably positioned in a tapered groove 110 which is integrally formed in an inner surface of the cover 20. The groove is formed in the cover 20 in a manner for providing that an external surface of the plate 22 is positioned in a plane inclined with respect to a vertical plane through the apparatus. Because of this inclination, the user of the apparatus has greater facility for viewing and inserting the power cable plug of a utility device into either of the receptacles. Furthermore, in view of the alignment of the receptacles in a single row, there is little likelihood that power cables for various utility devices will become entangled.

An inner shoulder 118 is formed in an edge of an integrally formed flange segment 119 of the plate 63. The cover member 20 is assembled on the plate 63 and a lower edge of wall 24 nests on shoulder 118.

The plate 63 includes a groove 120 which receives a lip or extending tongue segment 122 at an edge of the plate 22 and secures the receptacle plate in the body 20. The plate 63 further includes bosses 124 which are integrally molded in the plate and which are positioned for abutting against the circuit board 65 in order to secure this circuit board in place. The plate 63 is secured to the cover body 20 by screws 126 which extend through the plate and engage internally threaded integrally molded bosses 128. The bosses 128 are elongated and extend from the surface 23. Apertured metal caps 130 are press fitted to the ends of bosses 128 for protecting the entrance thread of the boss. The screws 126 extend through bosses 132 integrally formed in the plate 21. These bosses include a recessed segment for shielding the screw head from physical contact with a user. In addition, these bosses include skirt segments 134 which surround the caps 130 and, therefore, shield them from any possible contact with electrical elements or wiring within the apparatus. A skirt 136 is also integrally molded in the plate 22 for surrounding an internally exposed head of the hold-down screw of the differential transformer 70. The screws 126 comprise tamper-proof screws inhibiting ready removal of plate 63 by a user of the apparatus. Access to the second and third compartments of the apparatus is thus limited to trained personnel. Additionally, this is a protective measure in order to protect the user from injury by electrical shock. Support feet 138 are resilient and secured to the plate 63 and support the apparatus on a surface in a generally horizontal position. The plate 59, however, is removable for replacement of the line cord should it become frayed or worn. This replacement, however, will not expose the second and third compartments and assures that no components will be tampered with.

When desired, the receptacle plate 22 can be removed for replacement or substitution of receptacles of different types. Removal of the plate 22, of course, requires removal of the lower plate 63 and the ability to remove the tamper-proof screws.

A readily portable and relatively rugged ground fault interrupter apparatus has thus been described. The apparatus advantageously comprises the assembly of electrical components in a novel housing featuring compartmentization, a demountable receptacle plate for facilitating substitution of receptacles, a novel cable gripping arrangement and carrying handle arrangements, as well as features assuring elimination of shock hazard or providing facilities for replacing the cable.

While we have described a particular form of our invention, it will be understood that various modifications may be made by those skilled in the art without departing from the scope of the appended claims and the spirit of this invention.

We claim:

1. In an electrical apparatus for interrupting the coupling of electrical power between a source of power and a utility device upon the occurrence of a fault in a ground circuit, an improved portable housing arrangement for the apparatus comprising:

a thin-walled cover body formed of electrically insulative material, said cover body having an upper surface and an integral wall segment extending away from and discontinuously about the periphery of the surface;

said body including means for receiving a demountable receptacle plate in an aligned position;

a generally flat, thin-walled, demountable electrical receptacle mounting plate positioned in alignment with said cover body and forming with said wall segment a continuous four-sided wall for the apparatus, one side formed by said receptacle plate and a side opposite said receptacle plate including an aperture for receiving a power supply cable;

a generally flat, thin-walled electrically insulative base means formed of at least two generally flat members for supporting said body on a surface and for forming with said body an enclosure for components of a circuit arrangement for the apparatus; and a plurality of flat circuit boards formed of electrically insulative material supported within said housing in a direction parallel to said receptacle plate by members integrally molded in said cover body and forming with said cover body, said receptacle plate and said base means a plurality of compartments, one of said flat support plate members forming a closure for one of said plurality of compartments formed by one of said circuit boards and said wall segment including said apertured side.

2. The apparatus of claim 1 wherein said one of said circuit boards includes a plurality of feed-through terminals for receiving conductors of a power cable.

3. The apparatus of claim 1 including an electrical power supply input cable clamp comprising first and second semicircular segments having a plurality of semicircular ribs adapted to grip an electrical power supply input cable transversely at a plurality of axially spaced points and said first segment is integrally molded in said cover body or base means.

4. The apparatus of claim 3 wherein said integrally molded segment is molded in said cover body.

5. The apparatus of claim 1 wherein said receptacle plate includes a plurality of receptacle apertures, a plurality of receptacles mounted thereto at associated apertures by electrically conductive means, and a thin-walled insulative body positioned at an outer exposed surface of the plate and bonded thereto near each of said receptacle apertures.

6. The apparatus of claim 1 wherein said receptacle plate is positioned in a plane inclined with respect to said base means and includes a plurality of receptacles mounted thereon, all of said receptacles being aligned in a single direction on said plate.

7. The apparatus of claim 6 wherein said receptacle plate includes tapered flanges at opposite extremities thereof and a tongue segment at one edge thereof, said cover body includes integrally molded tapered grooves for receiving said flanges and said base means includes a groove for receiving said tongue segment for securing said receptacle plate.

8. The apparatus of claim 1 including a two-piece transport handle, said handle comprising a first member integrally molded to said cover body, said molded handle member having a pair of segments extending generally normally away from said wall and a transverse segment extending between said normal segments, and an elongated gripping member positioned on said transverse segment.

9. The apparatus of claim 8 wherein said transverse handle segment has a cross section which is generally arrow-shaped and said gripping member includes a groove having a cross section formed for receiving said arrow-shaped transverse segment.

10. The apparatus of claim 6 including a flat, linear, elongated ground bar of generally rectangular cross section which is formed of an electrically conductive material, said bar including a plurality of slots formed in the cross section along its length for receiving a grounding screw of a receptacle to thereby provide a common grounding bar for a plurality of receptacles, said ground bar including a flanged segment at an extremity thereof, thereby forming a male terminal for engaging a female connector.

11. In an electrical apparatus for interrupting the coupling of electrical power between a source of power and a utility device upon the occurrence of a fault in a ground circuit, an improved portable housing arrangement for the apparatus comprising;

a thin-walled cover body formed of electrically insulative material, said cover body having an upper surface and an integral wall segment extending away from and discontinuously about the periphery of the surface;

said body including means for receiving a demountable receptacle plate in an aligned position;

a generally flat, thin-walled, demountable electrical receptacle mounting plate positioned in alignment with said cover body and forming with said wall segment a continuous wall for the apparatus;

a generally flat, thin-walled electrically insulative base means for supporting said body on a surface and for forming with said body an enclosure for components of a circuit arrangement for the apparatus;

said cover body including a plurality of linear, elongated, integrally molded bosses extending from the upper surface in a direction generally perpendicular to said upper surface and for a distance substantially equal to a width of said wall, said bosses including recesses formed therein for receiving a mounting member, and said base means includes apertures formed therein through which a mounting member extends for securing said base means to said cover body; and circuit mounting means supported within said housing and forming with said cover body, said receptacle plate and said base means a plurality of compartments.

12. The apparatus of claim 11 including an apertured cap of electrically conductive material positioned on an extremity of said boss for introducing a mounting member to the recess of said boss, and an integrally molded skirt formed in said insulative support base means, co-aligned with said boss, and extending a distance away from said support base means for shielding said cap.

* * * * *